US008688979B2

(12) United States Patent
Partridge et al.

(10) Patent No.: US 8,688,979 B2
(45) Date of Patent: *Apr. 1, 2014

(54) MEANS OF MITIGATING DENIAL OF SERVICE ATTACKS ON IP FRAGMENTATION IN HIGH PERFORMANCE IPSEC GATEWAYS

(75) Inventors: Craig Partridge, El Cerrito, CA (US); Walter Clark Milliken, Dover, NH (US); David Patrick Mankins, Cambridge, MA (US)

(73) Assignees: Verizon Corporate Services Group Inc., Basking Ridge, NJ (US); Raytheon BBN Technologies Corp., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/040,905

(22) Filed: Mar. 4, 2011

(65) Prior Publication Data
US 2011/0161664 A1 Jun. 30, 2011

Related U.S. Application Data

(63) Continuation of application No. 10/714,101, filed on Nov. 14, 2003, now Pat. No. 7,921,285.

(60) Provisional application No. 60/436,778, filed on Dec. 27, 2002.

(51) Int. Cl.
*H04L 29/06* (2006.01)

(52) U.S. Cl.
USPC ........... 713/160; 713/150; 713/162; 709/230; 709/236; 370/351; 370/389; 370/475; 726/22; 726/23

(58) Field of Classification Search
None
See application file for complete search history.

(56) References Cited

U.S. PATENT DOCUMENTS

| 6,185,208 | B1 | 2/2001 | Liao |
| 6,341,129 | B1 * | 1/2002 | Schroeder et al. ............ 370/354 |
| 6,438,612 | B1 * | 8/2002 | Ylonen et al. ................ 709/249 |
| 6,650,636 | B1 | 11/2003 | Bradshaw et al. |
| 6,665,292 | B1 | 12/2003 | Bradshaw et al. |
| 6,684,329 | B1 * | 1/2004 | Epstein et al. ................ 713/150 |
| 6,714,985 | B1 * | 3/2004 | Malagrino et al. ............ 709/236 |
| 6,781,992 | B1 | 8/2004 | Rana |

(Continued)

OTHER PUBLICATIONS

Glenn et al., "The NULL Encryption Algorithm and Its Use With IPsec, RFC 2410," Network Working Group, Internet Engineering Task Force (IETF), The Internet Society, p. 1-6, Nov. 1998.

(Continued)

*Primary Examiner* — Michael R Vaughan

(57) ABSTRACT

Embodiments of the invention reduce the probability of success of a DOS attack on a node receiving packets by decreasing the probability of random collisions of packets sent by a malicious user with those sent by honest users. The probability of random collisions may be reduced in one class of embodiments of the invention by supplementing the identification field of the IP header of each transmitted packet with at least one bit from another field of the header. The probability of random collisions may be reduced in another class of embodiments of the invention by ensuring that packets sent from a transmitting IPsec node to a receiving IPsec node are not fragmented.

16 Claims, 8 Drawing Sheets

(56) References Cited

U.S. PATENT DOCUMENTS

| | | | |
|---|---|---|---|
| 7,027,443 B2 | 4/2006 | Nichols et al. | |
| 7,061,914 B2 | 6/2006 | Mankins | |
| 7,062,782 B1* | 6/2006 | Stone et al. | 726/22 |
| 7,065,086 B2* | 6/2006 | Basso et al. | 370/394 |
| 7,277,963 B2* | 10/2007 | Dolson et al. | 709/246 |
| 7,283,527 B2* | 10/2007 | Brown et al. | 370/392 |
| 7,356,599 B2* | 4/2008 | Pochon et al. | 709/229 |
| 7,426,534 B2 | 9/2008 | Challenger et al. | |
| 7,457,962 B2* | 11/2008 | Moskowitz | 713/176 |
| 7,487,255 B2 | 2/2009 | Roeder et al. | |
| 7,509,393 B2 | 3/2009 | Agarwalla et al. | |
| 7,519,070 B2 | 4/2009 | Van Lunteren | |
| 7,602,809 B2* | 10/2009 | Henriques | 370/471 |
| 7,647,503 B2* | 1/2010 | Moskowitz | 713/176 |
| 7,653,864 B2 | 1/2010 | Schroeder | |
| 7,697,524 B2* | 4/2010 | Subramanian et al. | 370/390 |
| 7,710,893 B2* | 5/2010 | Yoon et al. | 370/252 |
| 7,724,776 B2 | 5/2010 | Julien et al. | |
| 7,730,154 B2 | 6/2010 | Agarwalla et al. | |
| 7,739,497 B1* | 6/2010 | Fink et al. | 713/162 |
| 7,792,147 B1* | 9/2010 | Hernacki | 370/474 |
| 7,826,449 B2* | 11/2010 | Manjunatha et al. | 370/389 |
| 7,908,654 B2* | 3/2011 | Belenky et al. | 726/22 |
| 7,924,882 B2* | 4/2011 | Nagai et al. | 370/474 |
| 7,958,557 B2* | 6/2011 | Kwan | 726/23 |
| 7,962,741 B1* | 6/2011 | Alexander et al. | 713/151 |
| 8,059,551 B2* | 11/2011 | Milliken | 370/252 |
| 8,161,539 B2* | 4/2012 | Cyr et al. | 726/13 |
| 8,218,555 B2* | 7/2012 | Minami et al. | 370/401 |
| 2003/0039249 A1 | 2/2003 | Basso | |
| 2003/0048793 A1* | 3/2003 | Pochon et al. | 370/401 |
| 2003/0135616 A1* | 7/2003 | Carrico et al. | 709/225 |
| 2004/0093521 A1* | 5/2004 | Hamadeh et al. | 713/201 |
| 2004/0215976 A1* | 10/2004 | Jain | 713/201 |
| 2004/0243782 A1* | 12/2004 | Mankins | 711/170 |
| 2005/0220017 A1* | 10/2005 | Brand et al. | 370/230.1 |
| 2006/0185010 A1* | 8/2006 | Sultan | 726/12 |
| 2006/0218390 A1* | 9/2006 | Loughran et al. | 713/151 |
| 2006/0262808 A1* | 11/2006 | Lin et al. | 370/466 |
| 2007/0237157 A1* | 10/2007 | Frank et al. | 370/395.52 |
| 2008/0028467 A1* | 1/2008 | Kommareddy et al. | 726/23 |

OTHER PUBLICATIONS

Harkins et al., "The Internet Key Exchange (IKE), RFC 2409," Network Working Group, The Internet Society, Cisco Systems, Inc., pp. 1-41, Nov. 1998.

Kent et al., "IP Authentication Header, RFC 2402," Network Working Group, Internet Engineering Task Force (IETF), The Internet Society, pp. 1-22, Nov. 1998.

Kent et al., "IP Encapsulating Security Payload (ESP), RFC 2406," Network Working Group, Internet Engineering Task Force (IETF), http://www.ietf.org/rfc/rfc2406.txt, pp. 1-22, Nov. 1998.

Kent et al., "Security Architecture for the Internet Protocol, RFC 2401," Network Working Group, Internet Engineering Task Force (IEFT), The Internet Society, pp. 1-66, Nov. 1998.

Madson, et al., "The ESP DES-CBC Cipher Algorithm with Explicit IV—RFC 2405," Network Working Group, The Internet Society, http://www.hjp.at/doc/rfc/rfc2405.txt, 9 pages, Nov. 1998.

Madson et al., "The Use of HMAC-MD5-96 within ESP and AH, RFC 2403," Network Working Group, Internet Engineering Task Force (IETF), The Internet Society, pp. 1-7, Nov. 1998.

Madson et al., "The Use of HMAC-SHA-1-96 within EP and AH, RFC 2404," Network Working Group, Internet Engineering Task Force (IETF), The Internet Society, pp. 1-7, Nov. 1998.

Maughan et al., "Internet Security Association and Key Management Protocol (ISAKMP), RFC 2408," Network Working Group, Internet Engineering Task Force (IETF), The Internet Society, pp. 1-86, Nov. 1998.

Orman, "The Oakley Key Determination Protocol, RFC 2412," Network Working Group, The Internet Society, Department of Computer Science, University of Arizona, 46 pages, Nov. 1998.

Piper, "The Internet IP Security Domain of Interpretation for ISAKMP, RFC 2407," Network Working Group, Internet Engineering Task Force (IETF), The Internet Society, pp. 1-32, Nov. 1998.

Postel, et al., "Internet Protocol, DARPA Internet Program Protocol Specification, RCF 791," Information Sciences Institute. University of Southern California, 48 pages, Sep. 1981.

Thayer, et al., "IP Security Document Roadmap, RFC 2411," Network Working Group, Internet Engineering Task Force (IETF), The Internet Society, 10 pages, Nov. 1998.

* cited by examiner

MEANS OF MITIGATING DENIAL OF SERVICE ATTACKS ON IP FRAGMENTATION IN HIGH PERFORMANCE IPSEC GATEWAYS

RELATED APPLICATION

The present application is a continuation of U.S. patent application Ser. No. 10/714,101, filed on Nov. 14, 2003, which claims the benefit under 35 U.S.C. §119(e) of U.S. provisional patent application Ser. No. 60/436,778, filed on Dec. 27, 2002, the entirety of which is incorporated herein by reference.

ACKNOWLEDGMENT OF US GOVERNMENT SUPPORT

This invention was made with the support of the United States National Security Agency under Government contract number MDA904-02-G-0068. The United States Government has certain rights to this invention.

FIELD OF THE INVENTION

The present invention relates to secure communications over a plurality of data communications networks. More particularly, the present invention relates to secure communications involving, among other possibilities, local area networks such as Ethernet, wide area networks using technologies such as SONET and ATM, and wireless data networks such as those utilizing IEEE 802.11 wireless standards.

BACKGROUND OF THE INVENTION

The Internet Protocol (IP) works by sending packets across multiple networks from a source machine (or "host") to a destination machine (also known as a "host"). When crossing from one network to another, these packets are processed by gateways, which may reformat the packet in limited ways for transmission across the following network.

IP has a mechanism which allows a gateway to fragment IP packets into smaller pieces (known as "fragments") if this is required by the next network that the packet will transit. Fragmented packets are reassembled at their destination.

Security gateways are gateways that implement the IPsec protocol to ensure authenticity and/or confidentiality of packets that cross them. In security parlance, a security gateway has a "red" side and a "black" side. Data on the red side are private and need protection. Data on the black side are at least authenticated and hence are protected from modification by unauthorized parties. Data on the black side may additionally be encrypted, and may thus be protected from being read by unauthorized parties. A host may also implement the IPsec protocol; such a node will be called an "IPsec host" for purposes of this written description. Similarly, "IPsec node" will be used to designate either a security gateway or an IPsec host.

Security gateways use IPsec by wrapping packets received on the red side in an IPsec packet which is then carried inside an IP packet transmitted on the black side. Where a security gateway receives a packet that was fragmented while transiting the black network, the security gateway needs to reassemble the packet before the packet can be authenticated. This poses the risk of a potential denial-of-service (DOS) attack on a security gateway. Namely, a malicious user may flood the receiving security gateway with a large number of spurious packages that render reassembly at the receiving security gateway time-consuming and costly. Additionally, the receiving security gateway may be fooled into assembling spurious fragments with real fragments. Such incorrectly assembled packets may eventually be discarded because of their failure to be authenticated at the receiving security gateway; however, the attack will have succeeded because of the resources wasted in connection with assembling the packet containing spurious fragments.

Path MTU Discovery

Because fragmentation and reassembly impose costs on communication, the Internet community has created protocols and standards for discovering the maximum transmission unit (MTU) size for the path between two hosts. These protocols are known as PMTU (for Path MTU) discovery protocols.

PMTU discovery, when possible, provides a reliable hint for what MTU to use to send maximal-sized packets that avoid fragmentation on the way to the destination. Such information can only be considered a "hint" however, because changes in the network may change the routing path of packets sent from the source to the destination, which in turn may result in a different MTU for the new path.

PMTU discovery is typically implemented by sending IP datagrams (i.e., packets) of increasing size from the source to the destination in which the "Don't Fragment" (DF) bit in the fragmentation flag field of the IP header for each datagram is set to the value logical "1". When the size of a packet exceeds the maximum packet size value of one of the networks on the path, the gateway at the boundary of the network will discard the packet and send an Internet Control Message Protocol (ICMP) message back to the source. The PMTU is the length of the largest message that is shorter than the shortest message that triggers such an ICMP message. In this manner, the source may discover the PMTU for packets sent along the current path from the source to the destination. Additionally, the source may repeat the PMTU discovery process periodically to determine whether the path of transmitted packets to the destination has changed due to network traffic conditions.

PMTU discovery is not universally implemented, and there are some system administrators that do not permit ICMP "your message was too large"-messages to leave their networks out of fear that such messages represent a security vulnerability.

If one can discover the PMTU, then fragmentation can be performed on the red side of a security gateway. This will mean that all fragments are authenticated using IPsec, which removes fragment reassembly as a potential DOS vulnerability at the receiving security gateway. However, such PMTU information may not be available, whatever the reason.

16 Bits of IP-ID are not Enough

Reassembling fragments requires that a receiving IPsec node keep the fragments received in queue for a finite amount of time and wait for all the fragments to arrive. An attacker can interfere with a communication stream by causing a reassembler to insert a forged fragment into the queue, which will prevent received packets from being reassembled correctly.

As is known in the art, in Internet Protocol, each fragment of a parent packet contains a full IP header with most information in the fields of the IP header of the fragment inherited from the parent packet. In particular, each fragment will contain the same source host address information in the IP source address field, the same destination host information in the IP destination address field, and the same identification information in the 16-bit IP identification field as the parent packet. The first fragment of a packet will additionally contain header information from the higher-level protocols carried in the packet. As a result of fragmentation, fragments may overlap, duplicate fragments may arrive, and fragments may arrive out-of-order; however, most of these occurrences are rare in current networks, and the receiving node may in most cases ignore out-of-order, overlapping, or duplicate fragments.

Since a receiving security gateway (or more generally, an IPsec node) cannot tell if a fragment is valid until the corresponding packet has been reassembled and authenticated using IPsec, an attacker can force the receiving security gateway (or the IPsec node) to either assemble a packet containing forged elements, in which case the IPsec authentication will fail and the attack will have succeeded, or spend resources making multiple reassembly attempts based on differing combinations of arriving fragments. As the authentication process is expensive in terms of computer time, multiple reassembly attempts are a strain on the resources of the receiving security gateway or IPsec node. If the attacker could insert two false fragments, the attacker would quadruple the difficulty or processing time of the task of reassembly and verification. If the fragmentation behavior along the path to the receiving security gateway or IPsec node is predictable (for example, fragmentation behavior is such that all fragments but the last one are N bytes long), then even approaches that give preference to fragments that better fit with others and that do not overlap are vulnerable to this type of attack. Therefore, a malicious person could clog the reassembly machinery with a minimal amount of work.

The amount of time that a fragment waits in the reassembly queue is determined by how much time separates arriving fragments at the reassembling node. This, in turn, is influenced by factors in the network, such as the speed of intermediate links and queuing delays in intermediate routers.

One can set a minimum lower bound on how long the reassembly queue for a given packet must survive based on the minimum-speed link between the two ends of a IPsec protocol security association and the size of the fragments transmitted across that link. Two 256 Byte (i.e., $2^{11}$ bit) fragments arriving simultaneously at the upstream end of a 10 Megabit per second (i.e., $2^{23}$ bit/s) link—e.g., a wireless Ethernet—will be separated by 0.2 milliseconds ($2^{-12}$ seconds or about $0.2 \times 10^{-3}$ seconds) at the downstream end of the 10 Mbps link. This separation arises from the amount of time it takes for the second fragment to traverse the link. Larger fragment sizes only exacerbate the problem.

The minimum MTU allowed by version six of IP, IPv6, can be taken as a hint as to the capabilities that will be built into future networks. The MTU in IPv6 is 1280 Bytes (1280 B). Additionally, recent discussions regarding the non-support of PMTU in the public Internet cites the 1400 B packets on Sun Microsystem Inc.'s PPP-over-Ethernet as being a problem. Therefore, it seems reasonable to expect fragments of size 1024 B or more. 1024 B fragments would take 800 μsec to squeeze through a 10 Mbps link.

The example discussed above concerned the reassembly of two-fragment packets—more fragments per packet will also increase the probable lifetime of a reassembly queue. Unpredictable network queuing delays would also add to the expected lifetime of a fragment on a reassembly queue.

However, in this discussion of fragment size, one should remember that fragmentation may possibly occur such that a slightly-too-large packet will get fragmented into a large packet followed by a small one—e.g., the first fragment may be 1024 B, while the second one is only 100 B In this case, the reassembly-queue lifetime would be shorter than otherwise expected, because it would be dictated by the size of the second and subsequent packets, not the size of the first.

Are these time-scales long enough to present a vulnerability to DOS attacks?

Assume that an attacker wants to interfere with reassembly of packets between a specific pair of hosts, A and B. How much time would it take for an attacker to send $2^{16}$ fragments, each corresponding to one of the $2^{16}$ combinations possible in the IP identification field of an IP header for packets in flight between A and B? Such fragments need not be large for an effective attack—21-28 B may be sufficient (the smaller size corresponds to one byte of data with the relevant bit of the fragmentation flag set to a value indicating a final fragment, while the larger size is the smallest possible IP fragment that is not a final fragment)—though such unusually small fragments might be discarded as part of a strategy for dealing with DOS attacks. One may assume that the attacker uses a range of sizes averaging 128 B ($2^{10}$ bits).

For a link with a bandwidth of 100 Gbps, it takes only 10.3 nanoseconds to transmit a single 128 B fragment, and only 670 μs to transmit $2^{16}$ of them—one for each possible combination in the IP identification field. If the attacker is using only 10% of the link bandwidth, it would take 6.7 ms to transmit a set of fragments corresponding to all possible combination in the IP identification field.

In the 800 μs minimum lifetime of a reassembly queue located at the end of a sub-network with a bandwidth of 10 Mbps (e.g., the wireless Ethernet network discussed earlier), an attacker using 10% of the final link bandwidth can thus cover more than 10% of the IP identification field combinations, and will presumably be able to affect a corresponding portion of our fragments. While this number seems small, it is large enough to mostly shut down a TCP connection. By sending 64 thousand ($2^{16}$) fragments (one for each possible combination in the IP identification field), an attacker can guarantee a collision if fragments get separated in the network by more than 7 milliseconds.

This argument applies even if one imposes the restriction of only accepting fragments in order—all the attacker need do is repeatedly transmit forged second fragments.

In order to support fragment reassembly on a 100 Gbps security gateway, one needs to either be able to ignore or reject forged fragments.

Information in the IPsec header is not present in any fragment other than the initial fragment; such information may even not be present in the initial fragment if the initial fragment is too small to contain such information. Thus, IPsec header information cannot be used to address the discussed DOS attack.

There is thus a need for methods and apparatuses for reducing the probability of denial-of-service attacks based at a security gateway or IPsec node. Such methods and apparatuses need to be able to deal effectively with such attacks where they are based on the fragmentation-related sub-protocols associated with IP.

SUMMARY OF THE INVENTION

Embodiments of the invention may be used to reduce the probability of success of a DOS attack on a node receiving packets by decreasing the probability of random collisions of packets sent by a malicious user with those sent by honest users.

In one aspect of the invention, a method is provided for supplementing the identification field of the IP header of an IP datagram with at least one bit from another field of the IP header, whereby the security threat in connection with the transmission of the IP datagram is reduced.

In another aspect of the invention a method for formatting an IP datagram is provided. Identification information associated with data to be sent in the IP datagram is determined, the identification information having a length greater than 16 bits. At least one bit of the identification information is inserted into the identification field of the header for the IP datagram. The remaining bits of the identification information are inserted into at least one field of the header of the IP datagram other than the identification field.

In another aspect of the invention, a method for formatting an IP datagram is provided. A special value is determined based on a secret shared with a destination node. At least part of the special value is inserted into identification information carried by the header for the IP datagram, wherein the identification information is distributed over the identification field and at least one other field of the header of the IP datagram.

In another aspect of the invention, a method for facilitating fragmentation-free transmissions between two IPsec nodes implementing the IPsec protocol, is provided. A plurality of packets of differing size is transmitted from a first IPsec node to a second IPsec node, wherein the "Don't Fragment" (DF) bit in the fragmentation flag field in the header for each packet of the plurality is set to a value that is arranged to prevent fragmentation of the packet en route. A maximum packet size is determined for avoiding fragmentation in transmissions from the first IPsec node to the second IPsec node based on at least one response from the second IPsec node to the plurality of packets transmitted by the first IPsec node.

Other aspects of the invention are disclosed and discussed in the following written description, drawings and claims, including apparatuses and computer-readable media capable of performing methods of the invention.

DETAILED DESCRIPTION OF THE INVENTION

Embodiments of the invention reduce the probability of success of a DOS attack on a node receiving packets by decreasing the probability of random collisions of packets sent by a malicious user with those sent by honest users. As discussed earlier, the probability of random collisions may arise from the malicious user sending packets containing all or a substantial percentage of all possible combinations of the bit sequences for fields in the IP header that are normally used to identify groups of packets that are fragments belonging to the same integral message from an honest user.

The probability of random collisions may be reduced in one class of embodiments of the invention by supplementing the identification field of the IP header of each transmitted packet with at least one bit from another field of the header. The identification field in previously known systems carries identification information that is at most 16 bits long. In embodiments of the present invention, identification information that is more than 16 bits long can be placed in packets, which lowers the probability of random collisions of packets sent by a malicious user.

The probability of random collisions may be reduced in another class of embodiments of the invention by ensuring that packets sent from a transmitting node to a receiving node are not fragmented. Where the nodes are IPsec nodes running the IPsec protocol, fragmentation of packets from the transmitting IPsec node to the receiving IPsec node may be eliminated or reduced by determining the MTU along the current path for transmission from the transmitting IPsec node to the receiving IPsec node. This, in turn, may be accomplished on the basis of the relationship of trust established between the two nodes running the IPsec protocol. Additionally, unlike previously known methods and systems, the disclosed method for determining the MTU need not rely on feedback messages from intermediate nodes along the current path.

Figure 1:
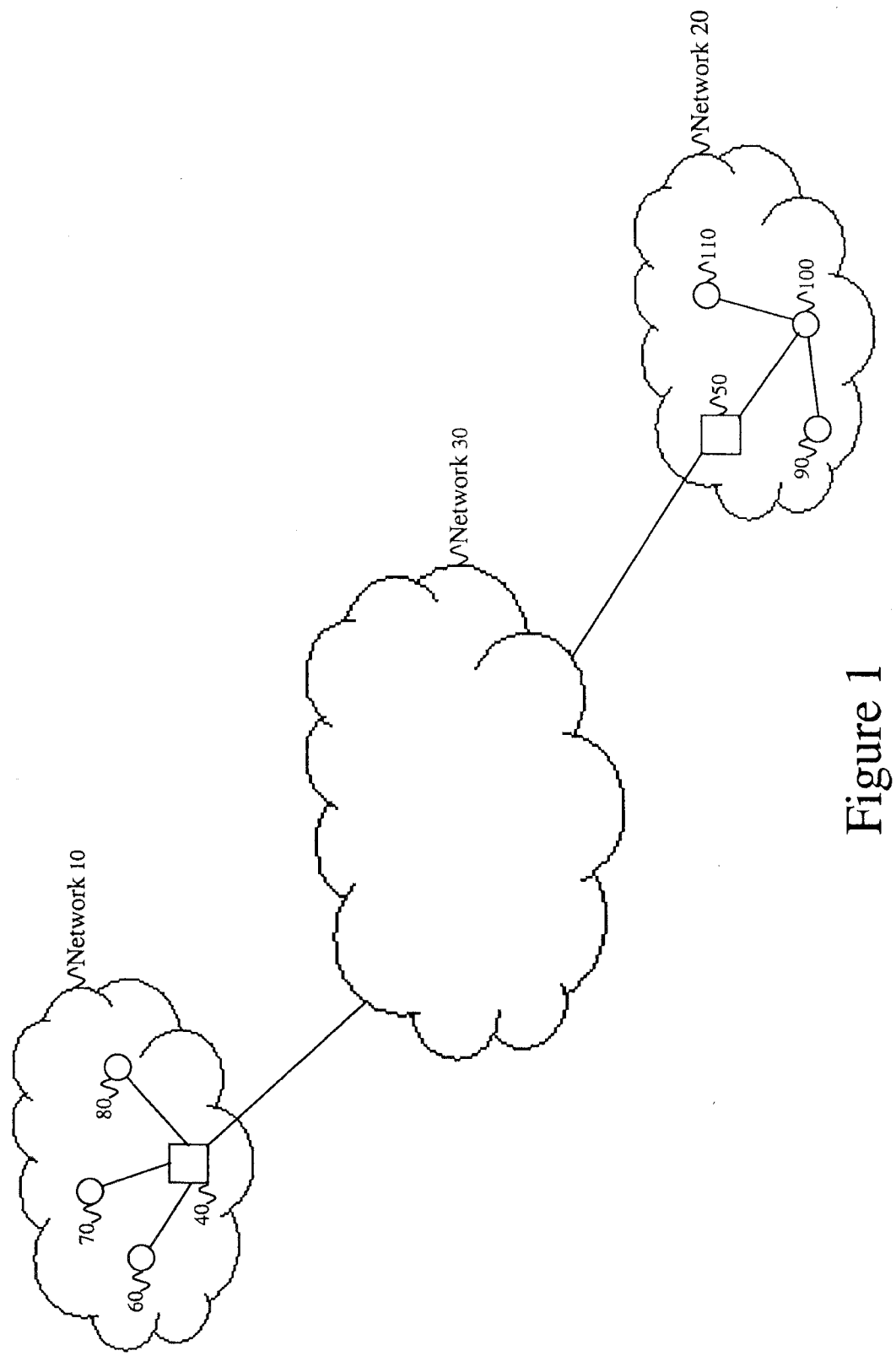
FIG. 1 shows an example of security gateways and communications networks that may be used in embodiments of the present invention.

FIG. 1 shows an exemplary system suitable for use with embodiments of the invention. FIG. 1 shows three Networks, Networks 10, 20 and 30 that are directly or indirectly connected to one another. Network 10 includes Hosts 60, 70 and 80 and Security Gateway 40. Network 20 includes Hosts 90, 100 and 110 and Security Gateway 50. For purposes of this invention, the term "node" may be used to designate a node on any network, and herein, includes a host or a security gateway.

In the embodiment depicted in FIG. 1, each of Networks 10, 20 and 30 may be any communications network, including but not limited to, the Internet, a local area network, a land-based telephone network or a wireless telephone network, or any combination thereof. Each of Networks 10, 20 and 30 may also be any one or any combination of these networks. In some embodiments, Networks 10, 20 and 30 may be distinct networks, whereas in other embodiments they may be identical or overlapping networks.

In the exemplary system of FIG. 1, a network node may communicate with another network node in the same or another network through communication protocols known to those of skill in the art. For example, in one embodiment, the Internet Protocol ("IP") may be used to convert communications into discrete packets (or "IP datagrams") that are then routed to other nodes. In such exemplary embodiments, the Transmission Control Protocol ("TCP") may be used in conjunction with IP to allow hosts to establish connections and exchange streams of data.

Security Gateways 40 and 50 in FIG. 1 are nodes that implement the IPsec protocol as currently defined in RFC 2401 and supplemented by RFCs 2402-2412 (as revised from time-to-time), all of which are known to those skilled in the art.

Figure 2:
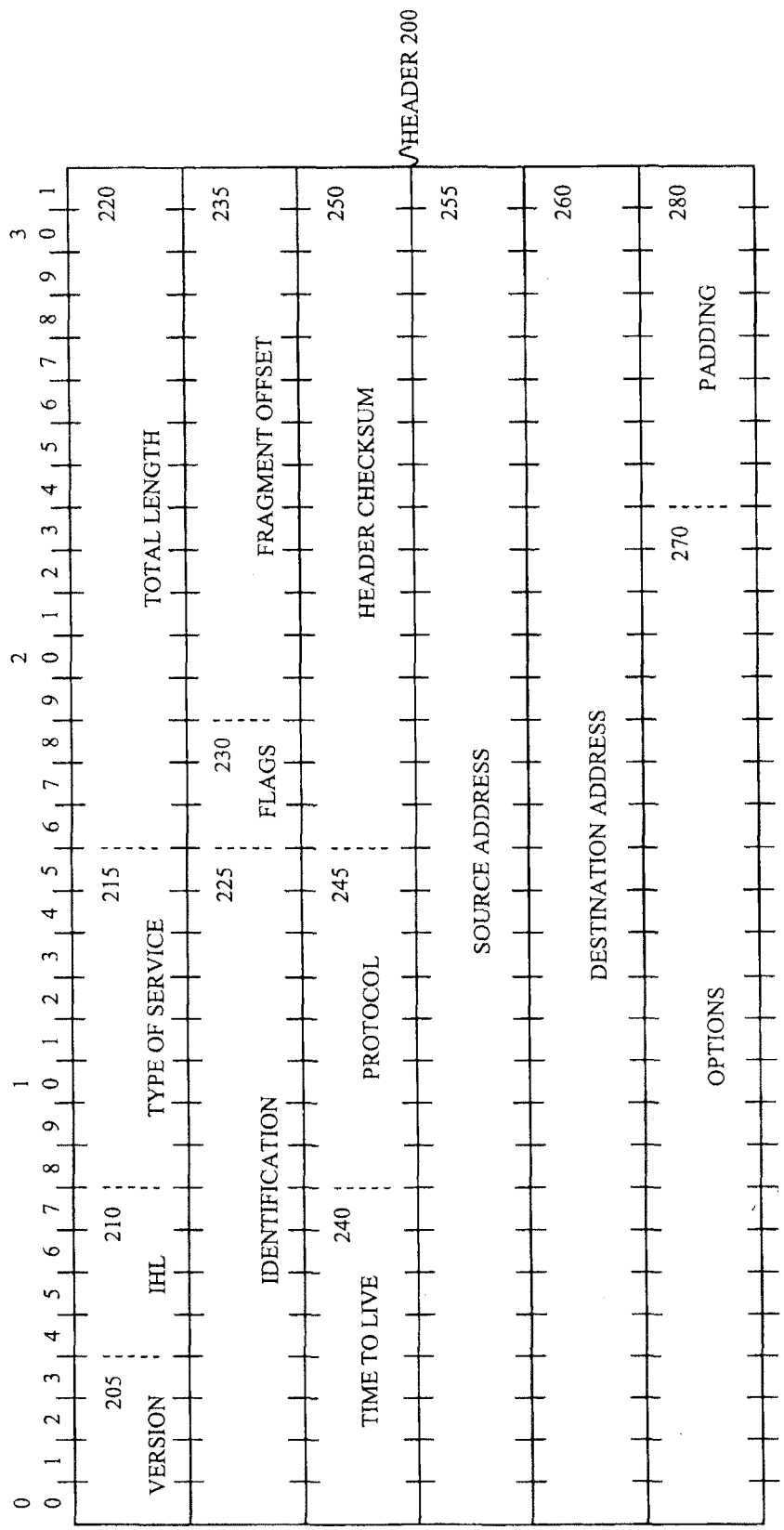
FIG. 2 shows the formatting for an Internet Protocol header, including the fields that are contained in the header.

In the currently used version of IP, IPv4, each packet contains a header ("IP header") comprising a number of fields that define various parameters associated with the packet, including delivery address information. The header format used in IPv4, which is defined by Internet Engineering Task Force's RFC 791, is shown in FIG. 2. The definition and lengths of each of the fields in an IP header are known to those skilled in the art. For example, in Header 200 of FIG. 2, the Protocol Field 245 is 8 bits long and contains protocol information in the form of the next level protocol that is used in the data portion of the FP datagram; the Destination Address Field 260 is 32 bits long and contains the destination address information; and the Source Address Field 255 is 32 bits long and contains the source address information.

The Fragmentation Flag Field 230 contains fragmentation flag information that specifies the fragmentation status of the packet. Bit zero of Fragmentation Flag Field 230 is reserved and must be set to zero. Bit 1 of this field indicates whether the packet may be fragmented or not—a value of zero indicates that the packet may be fragmented if necessary, whereas a value of one indicates that the packet may not be fragmented. Bit 2 of this field indicates whether the packet is the last fragment of a fragmented packet—a value of zero indicates that the packet is the last fragment of a packet that had been fragmented, whereas a value of one indicates that the packet is not the last fragment of a fragmented packet. The Fragment Offset Field 235 contains fragment offset information indicating the sequence number of the fragment in the datagram. Identification Field 225 contains identification information for a packet that associates all fragments that derive from that packet with the same 16-bit identification sequence.

In IP, a receiving node reassembles fragmented packets based on the source address information, destination address information, identification information and protocol information from the Source Address Field 255, Destination Address Field 260, Identification Field 225 and Protocol Field 245, respectively. All received packets containing the same information in these fields are identified as being part of the same datagram which is then reassembled sequentially based on the fragment offset information in the Fragment Offset Field 235.

Other fields in the IP Header 200 are known to those skilled in the art. Version Field 205 contains the IP protocol version number. This has been version 4 from 1979 up to the time this application was being prepared. IP Header Length Field 210 indicates the total header length in 32 bit words. Type of Service Field 215 contains options that describe how the packet should be treated in transit. Total Length Field 220 contains the packet length in bytes up to 65535 bytes, including bytes in the header. Time to Live Field 240 indicates the maximum lifetime of the packet. Header Checksum Field 250 contains a 16 bit checksum on the IP header only. Options Field 270 contains a number of options that can be set in connection with the packet. Padding Field 280 contains padding bits that are used to make the header's length an integer multiple of 32 bits.

Figure 3:
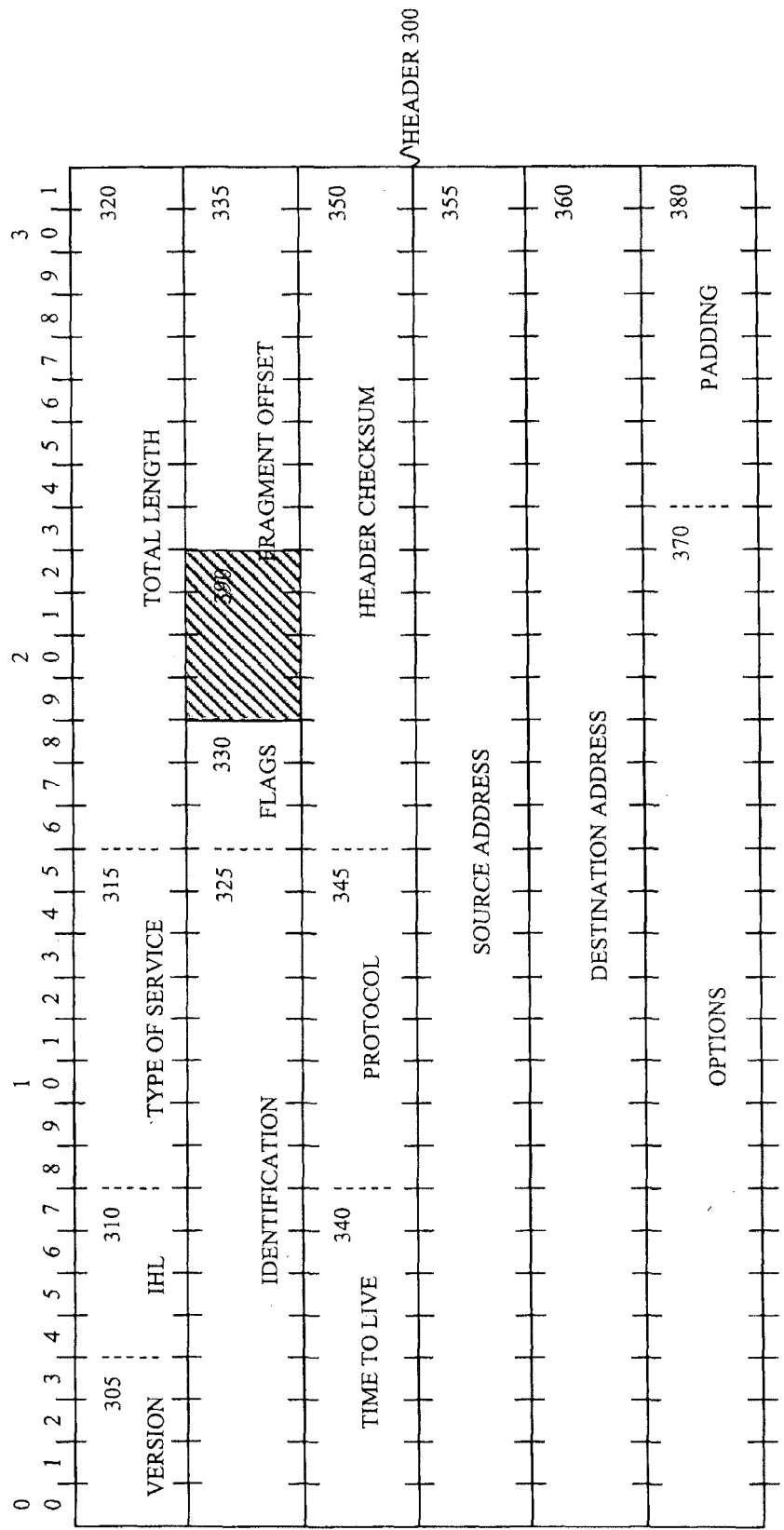
FIG. 3 shows an example of the formatting for an Internet Protocol header in an embodiment of the invention.

FIG. 3 shows modified IP Header 300 that exemplifies an embodiment of the invention. In Header 300, the identification information in Identification Field 325 has been supplemented by the use of three bits, Bits 390, of the Fragment Offset Field 335. Thus, the identification information for the packet having Header 300 is a bit sequence that is 19 bits long rather than one that is 16 bits long as normally used in IP headers. Thus, a set of packets received at a receiving node that comprises one integral message in this example of the embodiment used in FIG. 3 may have an identification information sequence that may be one from among $2^{19}$ sequences rather than one from among $2^{16}$ sequences. Because of this, the probability that a malicious attacker could force a random collision by flooding the receiving node with many packets is reduced. (For a collision to occur, the attacker would have to send at least one message containing the same source address information, destination address information, protocol information and identification information.) The three-bit borrowing indicated in FIG. 3 is only an example; generally, any number of bits may be borrowed from one or more fields of an IP header other than the Identification Field 325. In general, it is advantageous to borrow one or more bits from a field (or fields) whose contents are passed on to the corresponding field (or fields) of the fragments of a parent packet, i.e., inherited by the fragments, as a result of fragmentation. Such fields (other than the identification field 225) include, for example, Padding Field 205, Destination Address Field 260, Source Address Field 255, Protocol Field 245, Time to Live Field 240, Type of Service Field 215 and Version Field 205. It is also advantageous to borrow one or more bits from any of these fields in a way that does not otherwise interfere with the process of packet transmission; this may be provided by borrowing bits from a field in a way that does not otherwise interfere with the ordinary function of that field. Those skilled in the art may determine based on the disclosure in this specification which fields and which bits of which fields may be borrowed from to supplement the identification field in specific cases.

The other fields shown in the modified IP header of FIG. 3 are analogous on a one-to-one basis to the corresponding fields that were described in connection with the known IP header of FIG. 2.

"Identification information" as used herein designates information in a packet, other than source address information, destination address information and protocol information, that a receiving node uses to determine whether the packet is one from a group of packets that are part of the same integral message from a specific source node. As is known to those with skill in the art, a receiving node running the previously known Internet Protocol uses source address information from the source address field, destination address information from the destination address field, protocol information from the protocol field and identification information from the identification field of the IP header of received packets in identifying a group of packets that are part of the same integral message from a specific source node. The extended definition of "identification information" that is used in discussing embodiments of the present invention does not include any of: i) source address information consisting of the bit string in the source address field that identifies the source node of a packet, ii) destination address information consisting of the bit string in the destination address that identifies the destination node of a packet; and iii) protocol information consisting of the bit string in the protocol field that identifies the next-layer protocol for the packet. Of course, "identification information" may, as used herein in connection with this disclosure of certain embodiments of the invention, include bits that are part of any of the source address field, the destination address field and the protocol field that are otherwise not being used to carry source address information, destination address information and protocol information, respectively. Further, "identification information" as used herein may also or alternatively include bits from one or more other fields of the IP header besides the identification field, the source address field, the destination field and the protocol field.

Borrowing from the Address Fields

In certain embodiments of the invention, two cooperating security gateways or nodes can collaborate to extend the length of the identification information by using one or more bits from one or more fields in the IP header other than Identification Field 325. For example, two security gateways or nodes may each masquerade as a sub-network by responding to any address in the lower eight bits of their address field (i.e., the right-most 8 bits in Destination Address Field 260 as shown in FIG. 2, which comprise the sub-network sub-field.) In this mechanism, hosts A, with (black) network address A1.A2.A3.A4, would respond to any address in the range from A1.A2.A3.0 to A1.A2.A3.255, while host B, with (black) network address B1.B2.B3.B4 would respond to the address range B1.B2.B3.0 to B1.B2.B3.255. This gives as many as 8 more bits from each of the source and destination address fields to supplement the identification information for transmissions between the two gateways or nodes. In this example embodiment, the identification information may be extended from 16 bits to as many as 32 bits.

Operationally, when a packet is being transmitted from A to B in the embodiment discussed above, one of the 256 possible combinations for the sub-network address of A may be randomly chosen and placed into the source address field and one of the 256 possible combinations for the sub-network address of B may be randomly chosen and placed into the destination address field. In addition, identification information in the form of a 16-bit sequence may be randomly chosen and placed in the identification field of the header. The packet is then transmitted.

When fragments arrive at B, they are placed into a reassembly queue identified by a combination of the source address information, destination address information, identification information and the protocol information. In order to insert a forged fragment into the reassembly queue, the attacker has to correctly guess the source address information ($2^8$ choices), the destination address information ($2^8$ choices) and the identification information ($2^{16}$ choices). This is equivalent to guessing the correct value from $2^{32}$ choices. The odds for a random collision can be lowered even further by borrowing bits from additional fields; for example, if n bits are borrowed from the protocol field where n<8, then the attacker must guess the correct value from $2^{32+n}$ choices.

Once the packet is reassembled, the IPsec header data (i.e., the Security Association Index) will let the receiving security gateway recover the true source and destination addresses to use.

Borrowing from the Protocol Field

In another class of embodiments, one or more of the 8 bits of the protocol field in the IP header may be used to supplement the identification information similar to the case discussed above. In some of these embodiments, the transmitting and receiving nodes may agree beforehand on which bits to use in the protocol field to supplement the identification information. In others, the receiving gateway may make assumptions regarding which bits of the protocol field are being used to transmit supplemental identification information. In any case, the transmitting node may avoid the use of certain values or bits in the protocol field for this purpose, because some values appearing in the protocol field may correspond with protocols, for example, the UDP, TCP or ICMP protocols, that cause intermediate routers along the path to process the packet differently.

Using Bits of the Identification Field as a "Cookie"

The use of special values, or "cookies", is a means of providing a quick test of authenticity to address DOS attacks that is known to those of skill in the art. A cookie is a value that can be quickly checked but which is hard to guess. These values are values that only a valid sender is likely to know— either because the cookie-testing host previously told the sender to use the value or because the value is the result of a calculation based on a secret shared between the sender and the cookie-testing host.

Identification Field 325 itself could be used to carry such a cookie, but, as discussed above, network speeds are such that there are not a sufficient number of bits in Identification Field 325 to avoid random collisions caused by a malicious attacker. However, a cookie may be embedded in identification information that is supplemented by bits from one or more other fields of the IP header other than Identification Field 325. This would allow the receiving node to perform a quick test to reject forged fragments.

Security gateways already have mechanisms in place to establish shared secrets in the form of keys for security associations as provided in the IPsec protocol; therefore, security gateways may use these shared secrets to check the value of the relevant bits of the IP header. For example, the security gateways may agree that at least some bits carrying the identification information (either as found in the identification field, other IP header fields, or both) will be a pre-determined function of one or more of the source address information, the destination address information, the common secret and one or more of the otherwise unused bits of the identification field. This would allow the receiving security gateway to perform a quick test that permits it to discard forged fragments, and thus reduce the probability of a successful DOS attack.

In cases in which it may be assumed that fragments arrive more-or-less in order at the receiving node, inputs to the cookie selection test may include data like the Security Association ("SA") sequence number, as defined in IPsec, from the first fragment. By including SA sequencing data in the cookie selection test, replay attacks may be avoided or alleviated.

This mechanism offers protection from forged first fragments, because the first fragment will have to satisfy the rule or test based on the shared secret. Subsequent packets are subject to the test of having valid extended identification information as discussed earlier. This mechanism may reduce the risk of a successful DOS attack based on fragment-flooding.

A Red-to-Red Mechanism for MTU Discovery

Cooperating security gateways could implement PMTU discovery at a higher level. For example, nodes on the red sides of each of the transmitting and receiving nodes could exchange packets marked with the "Don't Fragment" (DF) bit of increasing size until they find a size that does not appear to make it across the network. Assuming traffic-masking measures are undertaken among communicating security gateways to conceal covert communication channels, such packets could be transmitted as part of the traffic-masking measures. The PMTU discovered by this mechanism could then be used in pre-emptive red-side fragmentation.

Red-to-red PMTU discovery has an advantage over black-side. PMTU discovery, because the PMTU packets are authenticated. Black-side PMTU discovery remains susceptible to an attack in which forged ICMP messages force one to choose an unnecessarily small MTU for the path.

Figure 4:
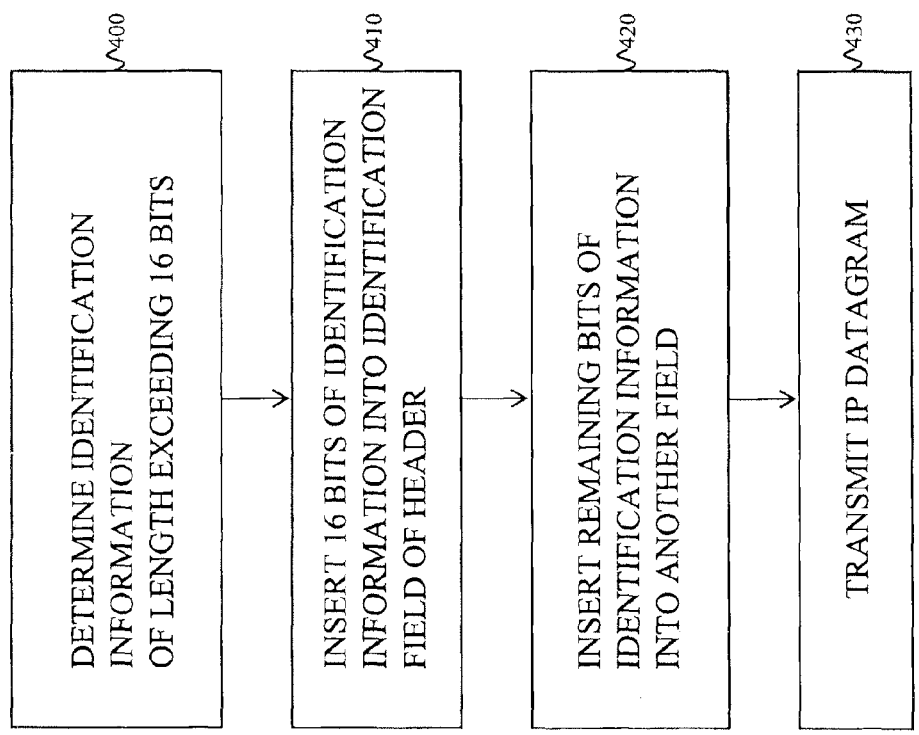
FIG. 4 shows a flow diagram of a method embodiment of the present invention which may be utilized at a transmitting node.

FIG. 4 shows a method embodiment of the invention that can be used at a transmitting security gateway, an IPsec node or an ordinary node. In Step 400, identification information having a bit-length greater than 16 bits is determined. For example, the node (or a unit attached or connected thereto) may determine or receive this information.

In Step 410, the node inserts 16 bits of the identification information into the identification field of the IP header.

In Step 420, the node inserts the remaining bits of the identification information into at least one other field in the IP header. For example, any of the IP header fields discussed earlier, or other IP header fields with unused or available bits may be used for this purpose.

In Step 430, the node transmits the IP datagram.

Figure 6:
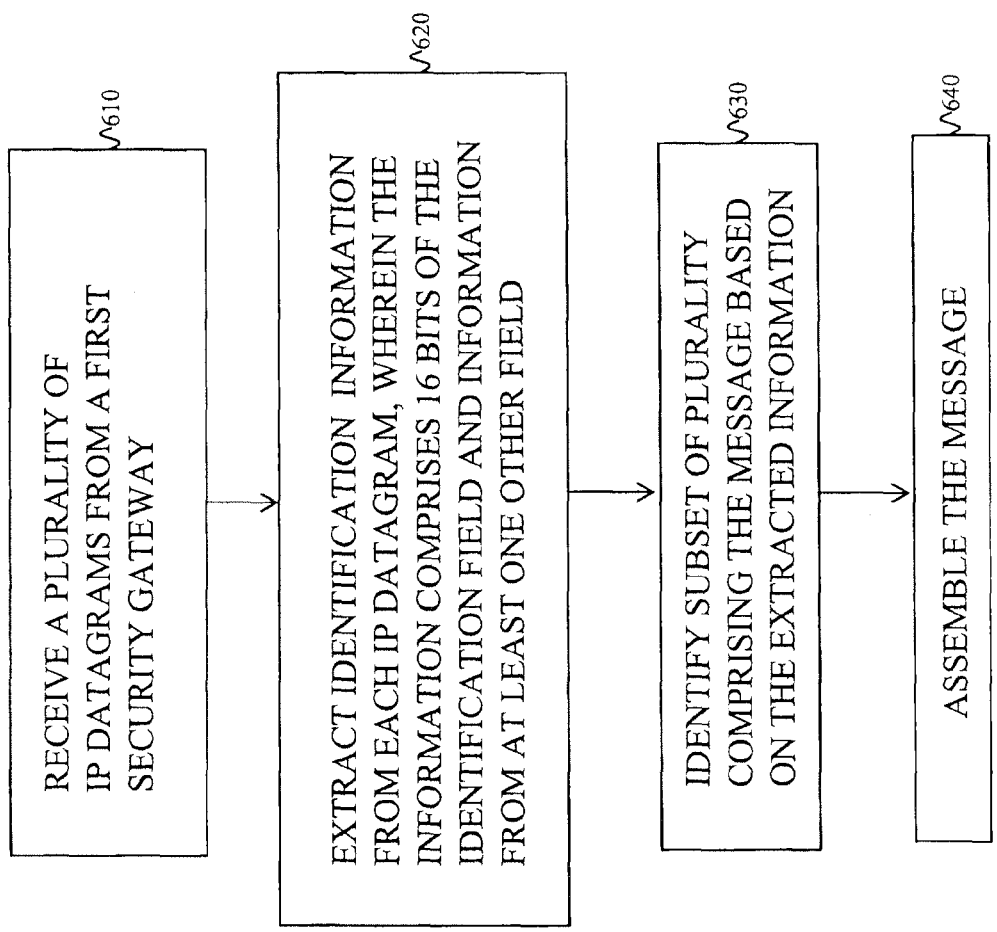
FIG. 6 shows a flow diagram of a method embodiment of the present invention which may be utilized at a receiving node.

FIG. 6 shows a method embodiment that may be used at a receiving security gateway, IPsec node or ordinary node The method embodiment shown in FIG. 6 is complementary to the method embodiment shown in FIG. 4, which may be executed at a transmitting node as discussed earlier. In Step 610, a plurality of IP datagrams is received. Such datagrams may be received at the receiving node and may include datagrams sent from or transmitted through a particular transmitting node, as well as other nodes.

In Step 620, identification information is extracted from received IP datagrams, wherein the extracted information comprises one or more bits from the identification field of the IP headers and one or more bits from at least one other field of the IP headers of the datagrams. For example, in a particular implementation of this embodiment, a receiving node may extract identification information comprising 16 bits of data from the identification field of a received packet and information from at least one other field of the IP header of the received packet.

The receiving node may identify the bits from the fields in the IP headers (as well as the order of such bits) based on pre-determined information that is shared with the transmitting node. For example, the receiving node and the transmitting node may have agreed based on one or more earlier transmissions which bits from which fields in the IP header will carry the identification information. Alternatively, the receiving node may guess this information based on, for example, the source information in the IP header, or other information that is available to it. In addition to the identification information, other information may be extracted from the IP headers of received datagrams, such as source and destination address information and protocol information.

In Step 630, a subset of the plurality is identified as comprising the set of packets forming the message from the transmitting node based on information extracted in Step 620. For example, the receiving node may identify a subset of packets from the plurality in which each packet has the same identification information, source address information, destination address information and/or protocol field information.

In Step 640, the message is assembled based on the subset identified in Step 630. In assembling the message, the receiving node may determine the order in which to piece together datagrams from the subset on basis of sequence number information from the IP header, or other header. For example, fragment offset information from the fragment offset field of the IP header may be used for this purpose. As another example, sequence number information from the SA header may be used where the packet was processed in accordance with the IPsec protocol.

Figure 5:
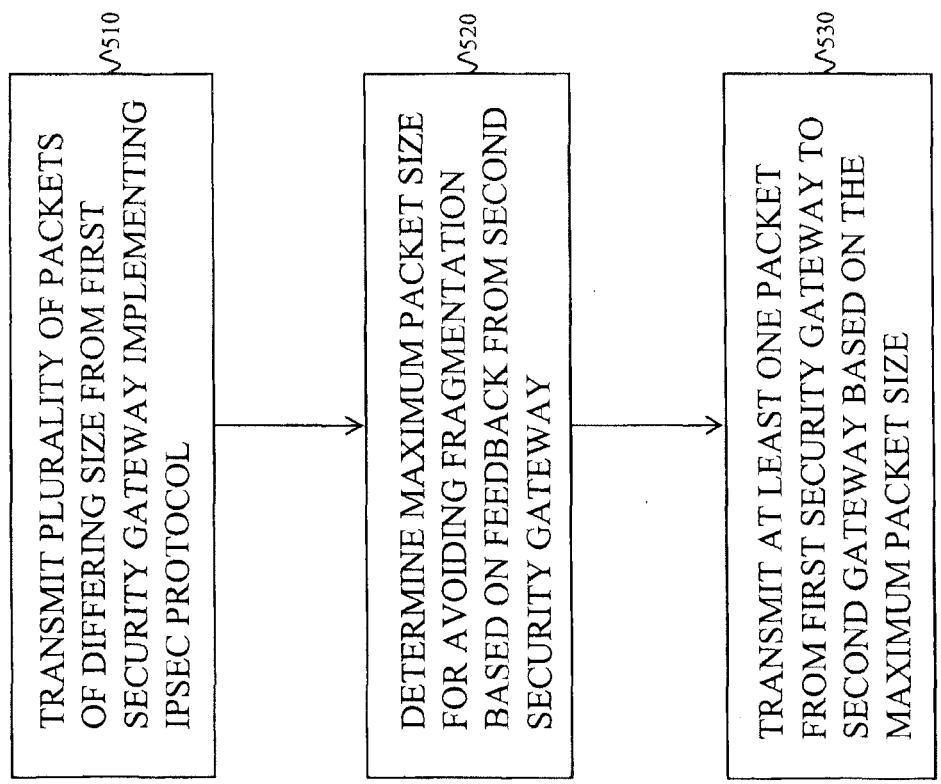
FIG. 5 shows a flow diagram of a method embodiment of the present invention which may be utilized at a transmitting security gateway.

FIG. 5 illustrates a method embodiment of the present invention which may be used at a transmitting IPsec node. In this method, the transmitting IPsec node determines the MTU applicable for the current path to a receiving IPsec node based on feedback from the IPsec node which is assumed to be trustworthy. In particular, feedback messages from intervening non-IPsec nodes are neither expected nor trusted in this method, and hence may be ignored in determining the MTU to the receiving IPsec node.

In Step 510, a plurality of packets of differing size are transmitted from a transmitting IPsec node to or through a receiving IPsec node. The transmitting IPsec node may, for example, set the "Don't Fragment" (DF) bit in these packets to logical "1", which would normally prevent fragmentation downstream.

In Step 520, a maximum packet size is determined that is associated with the current path to the receiving IPsec node. In one class of sub-embodiments, the receiving IPsec node may send a response or feedback message to the transmitting IPsec node every time it receives one of the packets of Step 510. The response message, among other things, may identify the packet (e.g., the size of the packet) of Step 510 to which it relates. In this manner, the transmitting IPsec node may determine the MTU for the current path based on the size of the largest packet of Step 510 that successfully arrives at the receiving IPsec node.

In another class of sub-embodiments, the receiving IPsec node may determine the MTU for the current path based on all the packets it actually receives from the transmitting IPsec node and an assumption or guess relating to the set of packets transmitted by the transmitting IPsec node in Step 510. For example, the receiving IPsec node may assume that the transmitting IPsec node transmitted packets of consecutively increasing size, and that all packets transmitted will arrive at the receiving IPsec node within a specific time interval. Under such an assumption, the MTU for the current path would be the size of the largest packet that is received within the specific time interval. The assumption itself, or part of it, may be based on a prior or concurrent exchange of information between the transmitting IPsec node and the receiving IPsec node; for example, the transmitting IPsec node may send information to the receiving IPsec node regarding the sizes of the packets sent by the transmitting IPsec node as well as their total number. Once the receiving IPsec node determines the MTU for the current path, it may transmit this information to the transmitting IPsec node.

In Step 530, one or more packets are sent to the receiving IPsec node so that each packet has a size that is less than or equal to the MTU size for the current path as determined in Step 520. The transmitting IPsec node, for example, may perform this step and determine the size of the transmitted packets based on the MTU that was determined for the current path. The prevention of the fragmentation of packets transmitted from the transmitting IPsec node to the receiving IPsec node through use of this method may decrease the probability of success of a DOS attack on the receiving IPsec node. This is because any packets that purport to be fragments of packets sent from the transmitting IPsec node may be assumed to be fraudulent and immediately discarded with small expenditure of resources.

Figure 7:
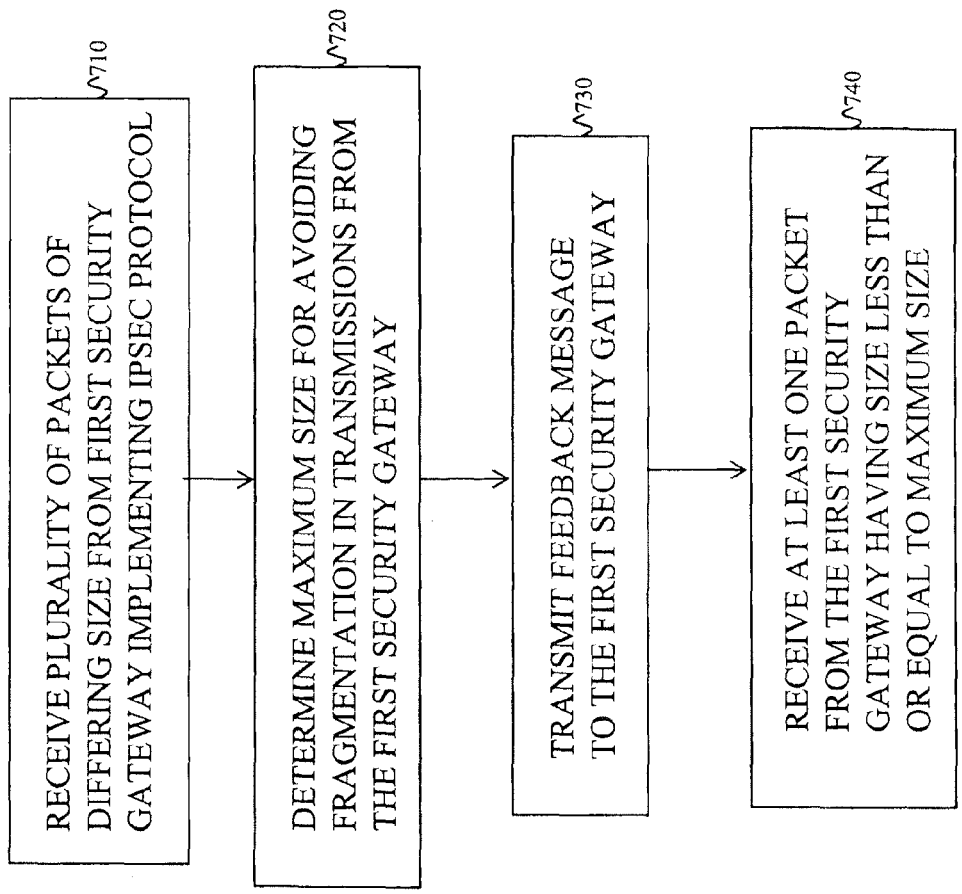
FIG. 7 shows a flow diagram of a method embodiment of the present invention which may be utilized at a receiving security gateway.

FIG. 7 illustrates a method embodiment of the present invention which may be used at a receiving IPsec node. The method embodiment shown in FIG. 7 is complementary to the method embodiment shown in FIG. 5, which may be executed at a transmitting node as discussed earlier. In Step 710, a plurality of packets of differing size are received from the transmitting IPsec node. The transmitting IPsec node may precede the transmission of these packets with a communication to the receiving IPsec node that it will send a plurality of packets to the receiving IPsec node to determine the MTU of the current path.

In Step 720, a maximum packet size is determined that is associated with the current path to the receiving IPsec node. In one class of sub-embodiments, the receiving IPsec may determine the MTU for the current path based on the packets it receives from the transmitting IPsec node at Step 710 and an assumption or guess relating to the set of packets originally transmitted by the transmitting IPsec node. For example, the receiving IPsec node may assume that the transmitting IPsec node transmitted packets of consecutively increasing size, and that all packets transmitted will arrive at the receiving IPsec node within a specific time interval. Under such an assumption, the MTU for the current path would be the size of the largest packet that is received within the specific time interval. The assumption itself, or part of it, may be based on a prior or concurrent exchange of information between the transmitting IPsec node and the receiving IPsec node; for example, the transmitting IPsec node may send information to the receiving IPsec node regarding the sizes of the packets sent by the transmitting IPsec node as well as their total number. Once the receiving IPsec node determines the MTU for the current path, it may transmit this information to the transmitting IPsec node in the form of a feedback message in Step 730.

In another class of sub-embodiments, the receiving IPsec node may merely send a response or feedback message to the transmitting IPsec node (e.g., Step 730) every time it receives one of the packets of Step 710. The response message, among other things, may identify the packet (e.g., the size of the packet) of Step 710 to which it relates. In this manner, the receiving IPsec node may cause the transmitting IPsec node to determine at Step 720 the MTU for the current path based on the size of the largest packet that is received at the receiving IPsec node in Step 710.

In Step 740, one or more packets are received from the transmitting IPsec node with each having a size that is less than or equal to the MTU size for the current path as determined in Step 720. The receiving IPsec node, for example, may receive these packets. Further, the sizes of the packets received from the transmitting IPsec node may have been determined based on the MTU that was determined for the current path. As discussed earlier in connection with FIG. 5, the prevention of the fragmentation of packets transmitted from the transmitting IPsec node to the receiving IPsec node through use of this method may decrease the probability of success of a DOS attack on the receiving IPsec node. This is because any packets that purport to be fragments of packets sent from the transmitting IPsec node may be assumed to be fraudulent and immediately discarded with small expenditure of resources.

Figure 8:
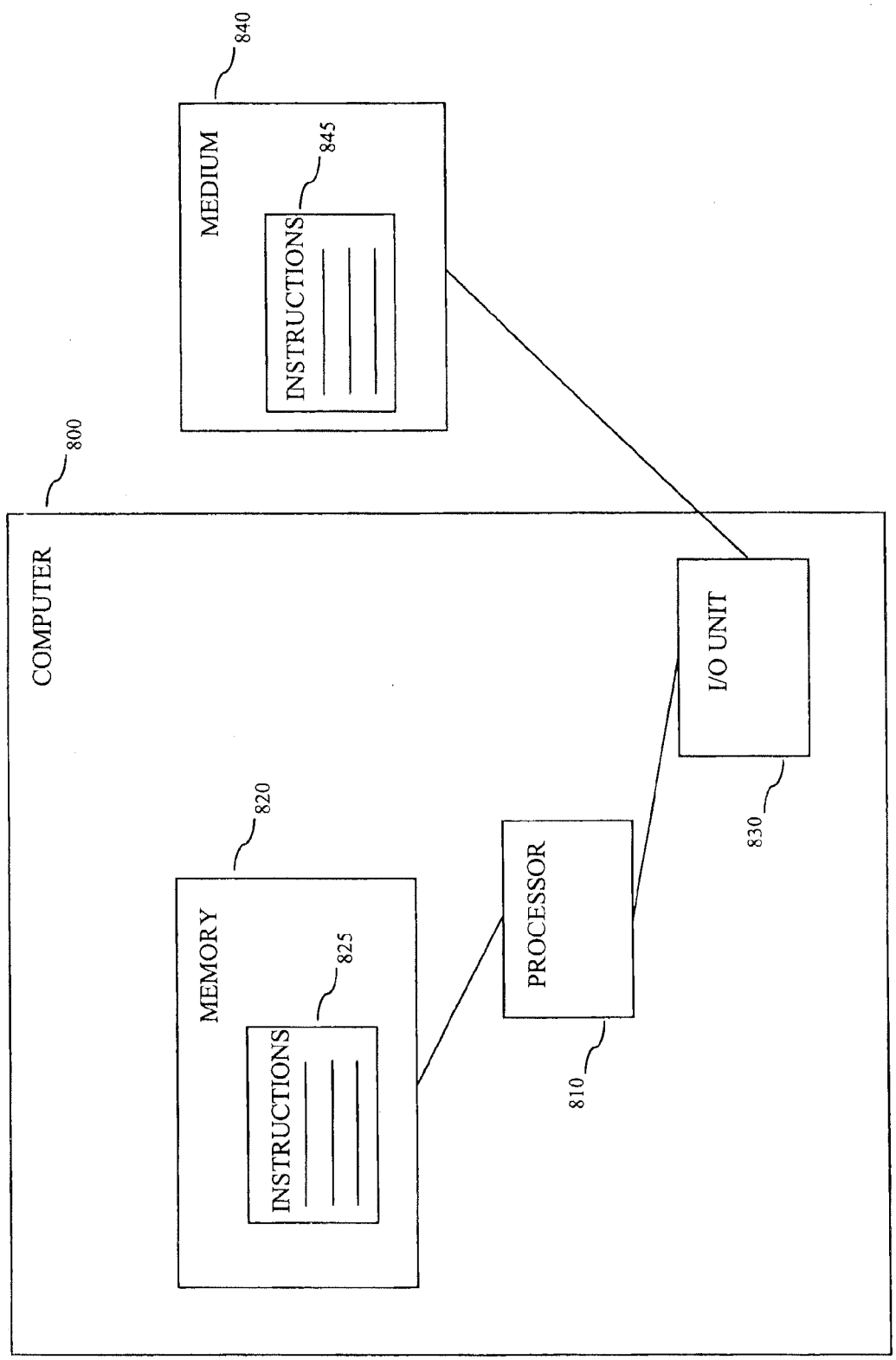
FIG. 8 shows a computer-implemented apparatus embodiment of the present invention and an embodiment incorporating a computer-readable medium.

FIG. 8 shows an example of an apparatus used in some embodiments of the present invention. In FIG. 8, a medium 840 containing Instructions 845 may be operatively coupled to a Computer 800. For example, Instructions 845 may contain the steps in an embodiment of a method of the present invention. In particular, Instructions 845 in a specific implementation may comprise the instructions corresponding to the steps shown in any of FIGS. 4-7. In the example depicted in FIG. 8, Computer 800 contains a Processor 810 which is coupled to an Input/Output Unit 830 and a Memory 820. Memory 820 may also have Instructions 825, which correspond to the steps in an embodiment of a method of the present invention. In a specific implementation, Instructions 845 of Medium 840 may be copied into Memory 820.

Instructions 845 may, for example, be part of software implementing the functions underlying Instructions 845. Persons skilled in the art may produce such software based on the disclosure in this specification.

Propagating signals embodied in a medium, such as a carrier wave or other carrier medium, that are products of embodiments of methods of the invention, or products of the use of embodiments of systems or devices of the present invention, are within the scope and spirit of the present invention and the appended claims.

The structures shown and discussed in apparatus embodiments of the invention are exemplary only and the functions performed by these structures may be performed by any number of structures. All of such possible variations are within the scope and spirit of embodiments of the invention and the appended claims.

Many variations are possible of the embodiments disclosed in this invention. For example, the embodiments for supplementing the identification information of packets with bits borrowed from other fields of the packet that were described in connection with IPsec nodes (as well as the embodiments relating to corresponding receivers that correctly parse the supplemented identification information) may also be used in connection with ordinary nodes that are not running the IPsec protocol.

In one variation of an embodiment disclosed in this specification, identification information may be supplemented using bits borrowed from the Fragment Offset Field. This involves guessing the value of the MTU along the current path to the destination, and fragmenting packets to fit that MTU. In this case, some of the bits in the 13-bit Fragment Offset Field 325 may be used to supplement the identification information, at least when the MTU is correctly guessed and during the period of time in which the MTU does not change. If the PMTU is guessed incorrectly, intermediate routers may fragment the message and change the value in Fragment Offset Field 325. Those skilled in the art will have sufficient knowledge based on the disclosure in this written description to develop algorithms that are robust in the face of such changes, because routers will in most cases change the value in Fragment Offset Field 325 in a predictable way.

In another variation of embodiments of the invention, the identification field of a packet may be supplemented with bits borrowed from another field of the packet in a way that leaves sufficient information in the other field for an intermediate or receiving node to carry out the functionality normally associated with the other field. In an implementation where bits are to be borrowed from the destination address field to supplement the identification information of a packet, a sufficient number of bits should be left (i.e. not borrowed to supplement the identification field) in the destination address field to allow intermediate and receiving nodes to correctly determine the destination. For example, where the lower eight bits of the destination address field corresponding to the sub-network sub-field are borrowed to supplement the identification field, the remaining 24 bits in the destination address field are sufficient to allow intermediate nodes to correctly forward the packet to the network-level node for the correct destination. Similarly in this example, the network-level node corresponding to the correct destination is able to determine that it is the correct recipient of the packet at the network level.

In another implementation of this embodiment where identification information is to be supplemented with bits from the protocol field, only a number of bits should be borrowed from the protocol field so that nodes that ordinarily process the protocol information will be able to carry out their ordinary processing based on the bits that were not borrowed from the protocol field. For example, where the protocol field of a packet identifies a particular protocol using only the lower six bits of the protocol field, the upper two bits may be borrowed for supplementing the identification information. In this example, nodes along the transmission path of the packet that process the protocol field will be able to correctly carry out their ordinary processing of the protocol information, despite the fact that two bits from the protocol field were used to supplement the identification field. The disclosure in this specification is sufficient for those skilled in the art to determine the number of bits that may be borrowed from a specific field in the IP header for purposes of supplementing the identification information without destroying the functionality of that specific field.

The present invention has been described in terms of several embodiments solely for the purpose of illustration, Persons skilled in the art will recognize from this description that the invention is not limited to the embodiments described, and may be practiced with modifications and alterations limited only by the spirit and scope of the appended claims which are intended to cover such modifications and alterations, so as to afford broad protection to the invention and its equivalents.

What is claimed is:

1. A method, comprising:
   supplementing, in a computing device having a processor and a memory, an identification field of a header of an IP datagram with at least one bit from another field of the IP header, whereby probability of random collisions is reduced, thereby reducing a security threat in connection with a transmission of the IP datagram; and
   after supplementing the identification field of the header with the at least one bit, inserting remaining bits of identification information into at least one other field of the header.

2. The method of claim 1, further comprising transmitting the IP datagram.

3. The method of claim 1, wherein the at least one other field of the header includes at least one of a source address field and a destination address field of the header.

4. The method of claim 3, further comprising:
   inserting source address information for the IP datagram into the source address field of the header for the IP datagram; and
   inserting destination address information for the IP datagram into the destination address field of the header for the IP datagram.

5. The method of claim 1, further comprising inserting at least one of the remaining bits into a protocol field of the header.

6. The method of claim 1, further comprising inserting at least one of the remaining bits into a fragment offset field of the header.

7. The method of claim 1, wherein supplementing the identification field includes inserting 16 bits of the identification information into an identification field of the header.

8. A system, comprising:
   a computing device including a processor and a memory, the memory including instructions executable by the processor for:
   supplementing an identification field of a header of an IP datagram with at least one bit from another field of the IP header, whereby probability of random collisions is reduced, thereby reducing a security threat in connection with a transmission of the IP datagram; and
   the instructions further executable by the processor for, after supplementing the identification field of the header with the at least one bit, inserting remaining bits of identification information into at least one other field of the header.

9. The system of claim 8, the instructions further executable by the processor for transmitting the IP datagram.

10. The system of claim 8, wherein the at least one other field of the header includes at least one of a source address field and a destination address field of the header.

11. The system of claim 10, the instructions further executable by the processor for:
    inserting source address information for the IP datagram into the source address field of the header for the IP datagram; and
    inserting destination address information for the IP datagram into the destination address field of the header for the IP datagram.

12. The system of claim 8, the instructions further executable by the processor for inserting at least one of the remaining bits into a protocol field of the header.

13. The system of claim 8, the instructions further executable by the processor for inserting at least one of the remaining bits into a fragment offset field of the header.

14. The system of claim 8, wherein supplementing the identification field includes inserting 16 bits of the identification information into an identification field of the header.

15. A method, comprising:
    assembling, in a computing device having a processor and a memory, a plurality of received IP datagrams that each has an IP header based on identification information contained in an identification field and at least one other field of the header of each of the received IP datagrams, wherein the identification information for each received IP datagram does not include source address information, destination address information or protocol information for that received IP datagram; and
    wherein the at least one other field comprises at least one field selected from the group consisting of the sub-net subfield of at least one of the source address field and the destination address field of the header of each received IP datagram, the protocol field of the header for each received IP datagram, and the fragment offset field of the header for each received IP datagram.

16. A system, comprising:
    a computing device including a processor and a memory, the memory including instructions executable by the processor for:
    assembling a plurality of received IP datagrams that each has an IP header based on identification information contained in an identification field and at least one other field of the header of each of the received IP datagrams, wherein the identification information for each received IP datagram does not include source address information, destination address information or protocol information for that received IP datagram; and
    wherein the at least one other field comprises at least one field selected from the group consisting of the sub-net subfield of at least one of the source address field and the destination address field of the header of each received IP datagram, the protocol field of the header for each received IP datagram, and the fragment offset field of the header for each received IP datagram.

* * * * *